United States Patent
Lee et al.

(10) Patent No.: US 7,454,137 B2
(45) Date of Patent: Nov. 18, 2008

(54) SCENE ADAPTIVE POWER CONTROL APPARATUS AND METHOD THEREOF

(75) Inventors: Sang-jin Lee, Seoul (KR); Moon-cheol Kim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 375 days.

(21) Appl. No.: 11/288,313

(22) Filed: Nov. 29, 2005

(65) Prior Publication Data

US 2006/0127081 A1     Jun. 15, 2006

(30) Foreign Application Priority Data

Dec. 15, 2004   (KR) .................... 10-2004-0106103

(51) Int. Cl.
| | |
|---|---|
| G03B 17/18 | (2006.01) |
| G03B 7/26 | (2006.01) |
| H04N 5/235 | (2006.01) |
| H04N 5/222 | (2006.01) |
| H04N 5/225 | (2006.01) |

(52) U.S. Cl. ............... 396/282; 396/301; 348/229.1; 348/333.01; 348/372; 348/672; 348/687

(58) Field of Classification Search .......... 396/213, 396/225, 232, 282, 301, 322, 374, 332; 348/229.1, 348/333.01, 362–365, 372, 602–603, 672, 348/687–689; 345/76, 82

See application file for complete search history.

(56) References Cited

U.S. PATENT DOCUMENTS 6,529,212 B2 * 3/2003 Miller et al. ................ 345/690
6,750,906 B1 * 6/2004 Itani et al. ................ 348/229.1
6,816,676 B2 * 11/2004 Bianchi et al. .............. 396/282

FOREIGN PATENT DOCUMENTS

| JP | 1-239589 | 9/1989 |
|---|---|---|
| JP | 4-349783 | 12/1992 |
| JP | 9-33342 | 2/1997 |
| JP | 2004-110050 | 4/2004 |
| KR | 2002-57407 | 7/2002 |

OTHER PUBLICATIONS

Korean Office Action dated May 22, 2006 issued in KR 2004-106103.

* cited by examiner

*Primary Examiner*—Melissa Jan Koval
(74) *Attorney, Agent, or Firm*—Stanzione & Kim, LLP (57) ABSTRACT

A scene adaptive power control device using a plurality of input images as consecutive input images and controlling a power level of a light source used in displaying the third input image. The scene adaptive power control device including a histogram analysis unit to analyze the second input image and detect a first maximum brightness value of the second input image, a determination unit to detect brightness values matching a first threshold as a predetermined frequency value in the generated histogram and determining a second maximum brightness value, a generation unit generating a power control signal to control the power level of the light source by a value obtained by dividing the second maximum brightness value by the first maximum brightness value, and a compensation unit increasing a brightness of the third input image inversely proportional to the power level of the light source reduced by the power control signal.

49 Claims, 6 Drawing Sheets

SCENE ADAPTIVE POWER CONTROL APPARATUS AND METHOD THEREOF

CROSS-REFERENCE TO RELATED APPLICATIONS

This application claims the benefit of Korean Patent Application No. 2004-106103, filed on Dec. 15, 2004, in the Korean Intellectual Property Office, the entire contents of which are incorporated herein by reference.

BACKGROUND OF THE INVENTION

1. Field of the Invention

The present general inventive concept relates to a scene adaptive power control apparatus. More particularly, the present general inventive concept relates to a scene adaptive power control apparatus and a method thereof which controls a power level of a light source according to an input scene using a histogram of an input image.

2. Description of the Related Art

As some recent display devices have a big-sized screen, these devices have a high power consumption to display an image with a sufficient brightness. Also, as a mobile display device becomes compact-sized, the display device has to reduce power consumption.

A brightness of an output image depends on a brightness of an input image and a level of power from a light source. However, since a light source of a conventional display device provides a constant level of brightness regardless of an image displayed on a screen, the respective power consumption is constant. In these types of display devices, a level of power from the light source is always maintained at a peak value. Accordingly, the brightness of the output image is determined based on the brightness of the input image regardless of the level of power from the light source.

Since the conventional display devices do not adjust the level of power from the light source according to a scene, power consumption has a constant peak value. In this case, unnecessary power consumption may occur even in a shadow image.

SUMMARY OF THE INVENTION

The present general inventive concept provides a scene adaptive power control apparatus and a method thereof. According to the present general inventive concept, a power control signal is generated to reduce a power level of a light source in proportion to a brightness value of an input image.

Additional aspects and advantages of the present general inventive concept will be set forth in part in the description which follows and, in part, will be obvious from the description, or may be learned by practice of the general inventive concept.

The foregoing and/or other aspects of the general inventive concept are achieved by providing a scene adaptive power control device which uses first, second and third input images as consecutive input images, and controls a power level of a light source used in displaying the third input image, the scene adaptive power control device including a histogram analysis unit to generate and analyze a histogram of the second input image and detect a first maximum brightness value which is the greatest brightness value of the second input image, a determination unit to detect brightness values that match a first threshold predetermined frequency value in the generated histogram and to determine the greatest value of the detected brightness values to be a second maximum brightness value, a generation unit to generate a power control signal to control the power level of the light source based on a value obtained by dividing the second maximum brightness value by the first maximum brightness value, and a compensation unit to increase a brightness of the third input image in inverse proportion to the power level of the light source reduced by the power control signal.

The foregoing and/or other aspects of the general inventive concept may also be achieved by providing, a scene adaptive power control apparatus, which uses first, second, third input images as consecutive input images and controls a power level of a light source used in displaying the third input image, including a histogram analysis unit to generate and analyze a histogram of the second input image and to detect a first maximum brightness value that is the greatest brightness value of the second input image, a determination unit to determine whether "brightness-values-likely-to-be-clipped" (BVLC) are concentrated on a certain region of a scene of the histogram of the second input image displayed, a calculation unit to calculate one of a mean brightness value and a median brightness value of the BVLC if the BVLC are concentrated on the certain region, a second maximum brightness value determination unit to determine a second maximum brightness value from the first maximum brightness value based on one of the mean brightness value and the median brightness value, a first threshold predetermined frequency value, and a second threshold, a generation unit to generate a power control signal to control the power level of the light source based on a value obtained by dividing the second maximum brightness value by the first maximum brightness value, an adjustment unit to adjust the power control signal based on brightness values of the second input image that are increased in inverse proportion to the power level of the light source reduced by the power control signal, and based on a maximum brightness value of the display device displaying the first to third input images, and a compensation unit to increase a brightness of the third input image in inverse proportion to the power level of the light source reduced by the adjusted power control signal.

The BVLC may be greater than the maximum brightness value of the display device.

The determination unit can determine whether the BVLC are concentrated on the certain region based on whether the number of brightness values exceeding the second maximum brightness value of the first input image in the certain region is greater than a predetermined number.

The second maximum brightness value determination unit may compare the greatest of brightness values matching the first threshold of the histogram on one hand with one of the mean brightness value and the median brightness value on the other hand, and as a result of the comparison, determines the greater value to be the second maximum brightness value.

The second maximum brightness value determination unit may determine whether a sum of frequency values of brightness values exceeding one of the mean brightness value and the median brightness value and also exceeding the greatest brightness value matching the first threshold is greater than a second threshold.

If the sum of frequency values is greater than the second threshold, it can be determined whether a sum of frequency values reaches the second threshold, by decrementing from the first maximum brightness value, until the sum reaches the second threshold at a certain brightness value, where the certain brightness value is determined to be the second maximum brightness value.

If the increased greatest brightness value of the second input image is below the maximum brightness value of the display device, the adjustment unit can adjust the power control signal based on a value used to adjust the brightness values of the second input image to make the greatest brightness value of the second input image equal to the maximum brightness value of the display device.

If the increased greatest brightness value of the second input image is greater than the maximum brightness value of the display device, the adjustment unit can adjust the greatest brightness value of the second input image according to the maximum brightness value of the display device.

If the increased greatest brightness value of the second input image is greater than the maximum brightness value of the display device, the adjustment unit adjusts the power control signal based on a value used to adjust the brightness values of the second input image to make the greatest brightness value exceeding a predetermined brightness value equal to the maximum brightness value of the display device The predetermined brightness value can be 0.8 times the second maximum brightness value.

The foregoing and/or other aspects of the general inventive concept may also be achieved by providing a scene adaptive power control method, which uses first, second and third input images as consecutive input images and controls a power level of a light source used in displaying the third input image, the method including generating and analyzing a histogram of the second input image and detecting a first maximum brightness value which is the greatest brightness value of the second input image, detecting brightness values matching a first threshold predetermined frequency value from the generated histogram and determining the greatest value of the detected brightness values as a second maximum brightness value, generating a power control signal based on a value obtained by dividing the second maximum brightness value by the first maximum brightness value, the power control signal to control the power level of the light source, and increasing a brightness of the third input image in inverse proportion to the power level of the light source reduced by the power control signal.

The foregoing and/or other aspects of the general inventive concept may also be achieved by providing a scene adaptive power control method which uses first, second, third input images as consecutive input images and controls a power level of a light source used in displaying the third input image, the method including generating and analyzing a histogram of the second input image and detecting a first maximum brightness value that is the greatest brightness value of the second input image, determining whether "brightness-values-likely-to-be-clipped" (BVLC) are concentrated on a certain region of a scene of the histogram of the second input image displayed, if the BVLC are concentrated on the certain region, calculating one of a mean brightness value and a median brightness value of the BVLC, determining a second maximum brightness value from the first maximum brightness value based on one of the mean brightness value and the median brightness value, a first threshold predetermined frequency value, and a second threshold, generating a power control signal based on a value obtained by dividing the second maximum brightness value by the first maximum brightness value, the power control signal to control the power level of the light source, adjusting the power control signal based on brightness values of the second input image that are increased in inverse proportion to the power level of the light source reduced by the power control signal, and based on a maximum brightness value of the display device displaying the first to third input images, and increasing a brightness of the third input image in inverse proportion to the power level of the light source reduced by the adjusted power control signal.

The BVLC may exceed the maximum brightness value of the display device.

The operation of determining whether the BVLC are concentrated on the certain region of the scene of the histogram of the second input image may be based on whether the number of brightness values exceeding the second maximum brightness value of the first input image in the certain region is greater than a predetermined number.

The operation of determining the second maximum brightness value from the first maximum brightness value can be based on one of the mean brightness value and the median brightness value, a first threshold predetermined frequency value, and a second threshold, further provides comparing the greatest value of brightness values matching the first threshold of the histogram on one hand with one of the mean brightness value and the median brightness value on the other hand, and as a result of the comparison, determines the greater value to be the second maximum brightness value.

The operation of determining the second maximum brightness value from the first maximum brightness value can be based on one of the mean brightness value and the median brightness value, a first threshold predetermined frequency value, and a second threshold, further provides determining whether a sum of frequency values of brightness values exceeding one of the mean brightness value and the median brightness value and also exceeding the greatest brightness value matching the first threshold is greater than a second threshold.

If the sum of frequency values is greater than the second threshold, it can be determined whether a sum of frequency values reaches the second threshold, while decrementing from the first maximum brightness value, and when the sum reaches the second threshold at a certain brightness value, the certain brightness value is determined to be the second maximum brightness value.

If the increased greatest brightness value of the second input image is below the maximum brightness value of the display device, the power control signal can be adjusted based on a value used to adjust the brightness values of the second input image to make the greatest brightness value of the second input image equal to the maximum brightness value of the display device.

If the increased greatest brightness value of the second input image is greater than the maximum brightness value of the display device, the greatest brightness value of the second input image can be adjusted according to the maximum brightness value of the display device.

If the increased greatest brightness value of the second input image is greater than the maximum brightness value of the display device, the power control signal can be adjusted based on a value used to adjust the brightness values of the second input image to make the greatest brightness value exceeding a predetermined brightness value equal to the maximum brightness value of the display device The predetermined brightness value can be 0.8 times the second maximum brightness value.

The foregoing and/or other aspects of the general inventive concept may also be achieved by providing a power control display device including a histogram analysis unit to generate a histogram of a first input image and to detect a first maximum brightness value based on the histogram, a determination unit to determine brightness values that match a first threshold frequency value in the generated histogram and to determine the greatest value of the determined brightness values as a second maximum brightness value, a generation unit to generate a power control signal to change the power level of a light source of the display based on a combination of the second maximum brightness value and the first maximum brightness value, and a compensation unit to change a brightness of a second input image in inverse proportion to the change of the power level of the light source.

The foregoing and/or other aspects of the general inventive concept may also be achieved by providing a method of controlling power of a display, the method including generating a histogram of a first input image to detect a first maximum brightness value based on the histogram, determining brightness values matching a first threshold frequency value in the generated histogram and determining the greatest value of the determined brightness values as a second maximum brightness, generating a power control signal to change the power level of a light source of the display based on a combination of the second maximum brightness value and the first maximum brightness value, and changing a brightness of a second input image in inverse proportion to the change of the power level of the light source.

The foregoing and/or other aspects of the general inventive concept may also be achieved by providing a power control display device including a histogram analysis unit to generate a histogram of a first input image and to detect a first maximum brightness value based on the histogram, a determination unit to determine whether "brightness-values-likely-to-be-clipped" (BVLC) are concentrated on a certain region of the histogram of the first input image displayed, a calculation unit to calculate one of a mean brightness value and a median brightness value of the BVLC if the BVLC are concentrated on the certain region, a second determination unit to determine a second maximum brightness value from the first maximum brightness value based on one of the mean brightness value and the median brightness value, a first threshold, and a second threshold, a generation unit to generate a power control signal to change the power level of a light source of the display based on a combination of the second maximum brightness value and the first maximum brightness value, and a compensation unit to change a brightness of a second input image in inverse proportion to the change of the power level of the light source.

The foregoing and/or other aspects of the general inventive concept may also be achieved by providing a method of controlling power of a display, the method including generating a histogram of a first input image and detecting a first maximum brightness value based on the histogram, determining whether "brightness-values-likely-to-be-clipped" (BVLC) are concentrated on a certain region of the histogram of the first input image displayed, calculating one of a mean brightness value and a median brightness value of the BVLC if the BVLC are concentrated on the certain region, determining a second maximum brightness value from the first maximum brightness value based on one of the mean brightness value and the median brightness value, a first threshold, and a second threshold, generating a power control signal to change the power level of a light source of the display based on a combination of the second maximum brightness value and the first maximum brightness value, and changing a brightness of a second input image in inverse proportion to the change of the power level of the light source controlled by the power control signal.

The foregoing and/or other aspects of the general inventive concept may also be achieved by providing a power control display device which uses first, second and third input images as consecutive input images and controls a power level of a light source used in displaying the third input image, the power control display device including a histogram analysis unit to determine a first maximum brightness value of the second input image, a determination unit to determine a second maximum brightness value by reducing the first maximum brightness value, a generation unit that uses the second input image to calculate a power control signal based on a combination of the first and second maximum brightness values, a power unit to apply the power control signal to lower the power level of the light source, and a compensation unit to increase the brightness value of the third input image in inverse proportion to the lowered power level of the light source.

The foregoing and/or other aspects of the general inventive concept may also be achieved by providing a power control display method which uses first, second and third input images as consecutive input images and controls a power level of a light source used in displaying the third input image, the method including determining a first maximum brightness value of the second input image, determining a second maximum brightness value by reducing the first maximum brightness value, using the second input image to calculate a power control signal based on a combination of the first and second maximum brightness values, applying the power control signal to lower the power level of the light, and increasing the brightness value of the third input image in inverse proportion to the lowered power level.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 1:
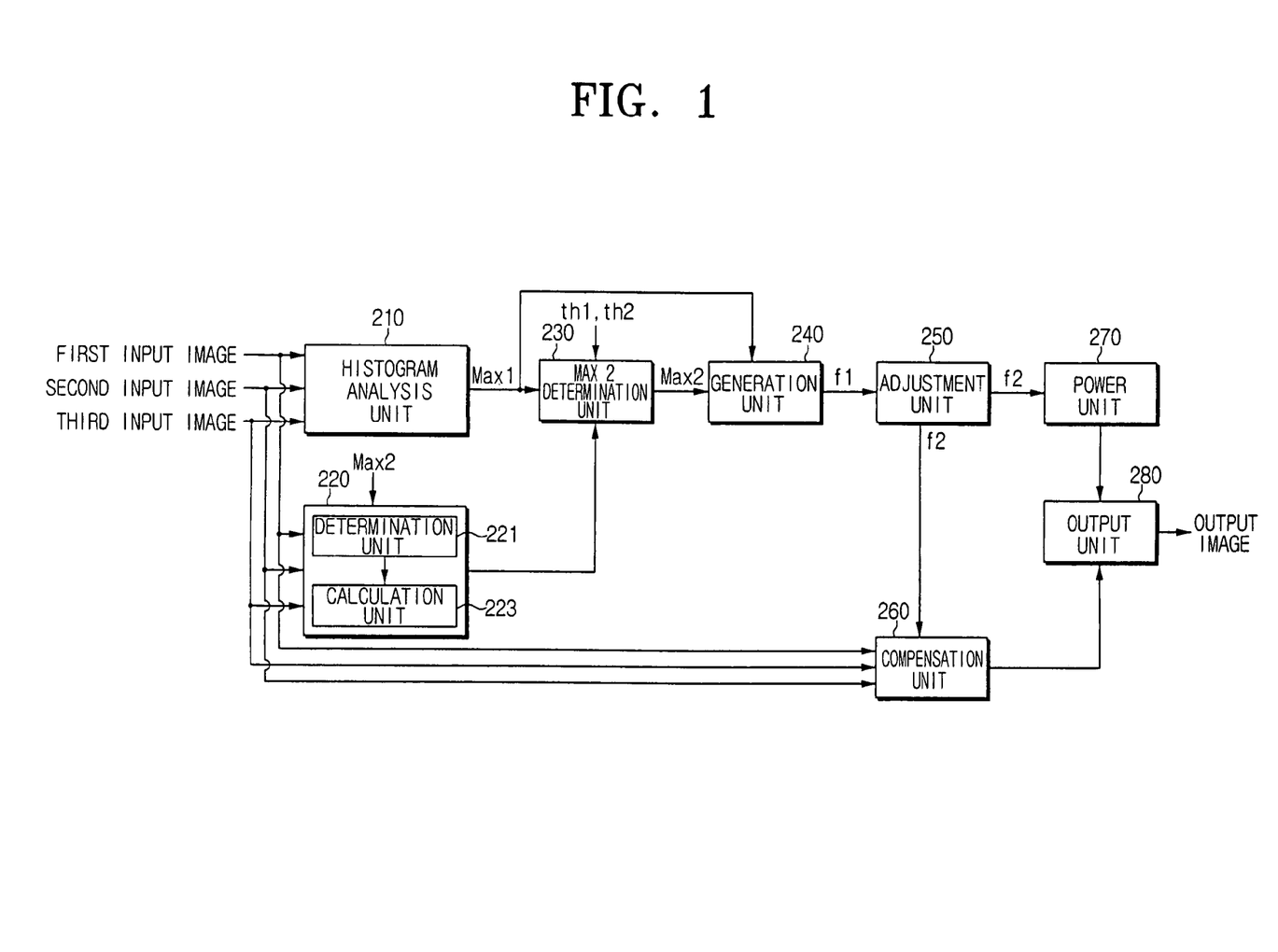
FIG. 1 is a block diagram illustrating a scene adaptive power control apparatus according to an embodiment of the present general inventive concept.

FIG. 1 is a block diagram illustrating a scene adaptive power control apparatus according to an embodiment of the present general inventive concept. In this embodiment, it is assumed that an input image signal is normalized to '1'. Also, the present general inventive concept is described using consecutive input images. These consecutive input images are defined as first, second, and third input images.

Referring to FIG. 1, a scene adaptive power control apparatus includes a histogram analysis unit 210, a brightness analysis unit 220, a second maximum brightness value determination unit 230, a generation unit 240, an adjustment unit 250, a compensation unit 260, a power unit 270, and an output unit 280. The brightness analysis unit 220 can include a determination unit 221 and a calculation unit 223.

The histogram analysis unit 210 can generate and analyze a histogram of an input image and then detect a maximum brightness value of the input image. The maximum brightness value is detected by the histogram analysis unit 210 regardless of a pixel frequency value of the input image. The detected maximum brightness value is defined as a first maximum brightness value Max 1.

The brightness analysis unit 220 can determine whether "brightness-values-likely-to-be-clipped" (BVLC) of brightness values used in generating the histogram are concentrated on a certain region. When a power control signal generated by the generation unit 240 is applied to brightness values of the input image used in generating the histogram, the BVLC have values exceeding the greatest brightness value the display device can express, and thus cannot be expressed on the display device.

If the BVLC are concentrated on a certain region of a scene and are actually clipped in the display, an image distortion occurs. Therefore, the brightness analysis unit 220 provides information about the concentrated BVLC to the calculation unit 223 so that the BVLC that are concentrated on the certain region are taken into account when the Max 1 value is amended.

More specifically, the determination unit 221 of the brightness analysis unit 220 determines whether the BVLC are concentrated on a certain region by the histogram generated by the histogram analysis unit 210. If the BVLC concentrated on the certain region are actually clipped, an image distortion may occur due to an unnatural grayscale. Therefore, if the BVLC are concentrated on a certain region, the BVLC must be taken into account when the Max 1 value is amended.

In this case the BVLC exceed a maximum brightness value of a previous input image, which is input before the current input image. Therefore, whether the BVLC are concentrated on a certain region is determined by comparing the respective brightness values of the current input image with the maximum brightness value of the previous image, which is determined based on a histogram of the previous input image, and determining whether the number of the brightness values exceeding the maximum brightness value of the previous values in the certain region is greater than a predetermined number.

If the BVLC are concentrated on the certain region, the calculation unit 223 of the brightness analysis unit 220 calculates a mean brightness value S or a median brightness value of the certain region.

For example, a 7×3 window is established on the current input image. If, for example, 18 or more of 21 pixels have brightness values exceeding the maximum brightness value of the previous image, it is determined that the BVLC are concentrated on the certain region. The mean brightness value S or the median brightness value is calculated based on the brightness values of pixels within the window which is used in determining whether the BVLC are concentrated on the certain region.

The Max 2 determination unit 230 determines a second maximum brightness value Max 2. The Max 2 value is used in generating a power control signal of a light source and is calculated by amending the Max 1 value. That is, the Max 1 value detected by the histogram analysis unit 210 is amended to become the Max 2 value based on one of the mean brightness value S and the median brightness value and a first threshold. The first threshold is a predetermined pixel frequency value based on the histogram of the input image.

If a brightness value is above the second maximum brightness Max 2 but has a low pixel frequency value, the brightness value is disregarded in determining a power level of the light source, and thus the power level of the light source is reduced.

If a pixel in the input image has a frequency value below the first threshold and a high brightness value, the Max 2 determination unit 230 calculates the Max 2 value without considering the brightness value of the pixel. If the Max 2 value is determined without considering the pixel having the high brightness value and the low frequency value, the input image is determined to have a relatively low maximum brightness value. Therefore, a power level of the light source to be applied to the input image is reduced accordingly.

If, however, the BVLC are not determined to be concentrated on a certain region by the determination unit 221, the Max 2 determination unit 230 determines if a brightness value matches the first threshold while decrementing the Max 1 value. The Max 2 determination unit 230 determines the first brightness value matching the first threshold to be a second maximum brightness value Max 2. That is, the greatest of the brightness values matching the first threshold is determined to be the Max 2 value.

If the BVLC are not concentrated on a certain region, the Max 2 value is determined without considering a brightness value having a high brightness level but having a low frequency value. The reason to disregard high brightness values having low frequency values is because these values do not cause image distortion. That is, if the BVLC are discretely distributed over the scene, regardless of whether these values are actually clipped, a natural grayscale can still be obtained.

If the BVLC are concentrated on a certain region, the Max 2 determination unit 230 compares the first brightness values matching the first threshold with the mean brightness value S or the median brightness value calculated by the calculation unit 223, and decrements the Max 1 value. As a result of the comparison, the greater value is determined to be the second maximum brightness value Max 2.

Similar to the case where the BVLC are not concentrated on a certain region, if the greatest value matching the first threshold is below the mean brightness value S or the median brightness value, but is still determined to be the second maximum brightness value Max 2, an image distortion may occur. Therefore, if the BVLC are concentrated on a certain region, the mean brightness value S or the median brightness value of the certain region must be calculated and taken into account in calculating the Max 2 value.

In another case where high pixel frequency values are skewed to low brightness values (i.e. an input image has a large number of pixels having a low brightness value), if a second maximum brightness value Max 2 is determined based on the comparison between the maximum brightness value matching the first threshold on one hand and the mean brightness value S or the median brightness value on the other hand, an image distortion may still occur. In this case, the second maximum brightness value Max 2 has a relatively low value and the brightness values exceeding the relatively small Max 2 value have low pixel frequency values. However, if a sum of the bright pixel frequency values is large, an image distortion occurs because the high brightness values having a low frequency value are not expressed.

Therefore, in this case, pixel frequency values of pixels having brightness values exceeding the second maximum brightness value Max 2 are compared with a second threshold. It is determined whether a sum of corresponding frequency values reaches the second threshold while decrementing from the Max 1 value. When the sum of frequency values reaches the second threshold at a certain brightness value, the certain brightness value is determined to be the Max 2 value. The second threshold is a predetermined number which may be compared to the sum of the frequency values having a high level of brightness exceeding Max 2.

Referring to FIG. 1, the generation unit 240 generates a power control signal f1 of a light source using the first maximum brightness value Max 1 and the second maximum brightness value Max 2. The power control signal f1 of the light source is obtained based on the following equation:

$$f1 = \frac{Max2}{Max1} \quad \text{[Equation 1]}$$

where f1 denotes a power control single of a light source, Max 1 denotes a first maximum brightness value calculated by the histogram analysis unit 210, and Max 2 denotes a second maximum brightness value calculated by the Max 2 determination unit 230.

The Max 1 value is the greatest brightness value of the input image before being amended, and the Max 2 value is determined without considering the high level of brightness values having low frequency values. Therefore, the Max 2 value is less than the Max 1 value, and the corresponding value of f1 is less than '1'. Since the power control signal f1 is amended to reduce the maximum brightness value of the input image to be displayed, it is possible to reduce the power level of the light source depending on the maximum brightness value of the input image.

The adjustment unit 250 applies the power control signal f1 generated by the generation unit 240 to a brightness of the input image, thus adjusting an output value according to the maximum brightness value of the display device, and adjusting the f1 signal to correspond to the adjusted output value. That is, after the f1 signal is applied, if the greatest of the output values is less than the maximum brightness value of the display device, the greatest output value is increased to reach the maximum brightness value of the display device, and the power control signal f1 is decreased based on the adjusted output value.

On the other hand, if the greatest output value exceeds the maximum brightness value of the display device, the output value is decreased to reach the maximum brightness value of the display device because the display device cannot express the brightness of output values that exceed the maximum capacity of the display device. Based on the adjusted output value, the f1 signal is increased. If the greatest output value exceeds the maximum brightness value of the display device, the f1 signal is not adjusted and applied to a brightness value until the brightness value is adjusted to reach the maximum brightness value of the display device.

Even if the brightness values exceeding the maximum brightness value of the display device are actually clipped, an image distortion does not necessarily occur. This is because the generation unit 240 generates the power control signal f1 based on the Max 2 value that is determined in consideration of the case that the BVLC are actually clipped.

The adjustment unit 250 adjusts the power control signal f1 and outputs an adjusted power control signal f2 to the power unit 270. The power control signal f2 is adjusted based on the f1 signal to output the greatest value that is equal to the maximum brightness value of the display device. The power unit 270 decreases a power level of the light source used in outputting the image based on the power control signal f2.

The compensation unit 260 compensates a reduction in the level of brightness, which is caused by the power control signal f2 adjusted by the adjustment unit 250 and applied to the power of the light source to reduce the power level. The power level of the light source, which is reduced by the power control signal f2, is applied to a next image that follows the input image used in generating the power control signal. Accordingly, a brightness of the next image is compensated such that the brightness of the next image is in inverse proportion to the reduction of the power level of the light source. The power control signal f2 is less than '1.' The brightness of the next image is multiplied with a reciprocal number of the power control signal f2, thus causing the brightness to increase. As a result, the power level of the light source is reduced, and the entire output image maintains a constant level of brightness.

The input images are consecutively inputted to the histogram analysis unit 210. If these input images are first, second, and third input images, the second input image is used in generating the power control signal f1, and the power controls signal f1 is applied to the third input image. The first input image is used to determine the Max 2 value of the second input image. That is, the Max 2 value of the first input image is used in determining whether the BVLC are concentrated on a certain region of the second input image.

The power unit 270 provides power from a light source to display the input image, and is inputted with the power control signal f2 adjusted by the adjustment unit 250. Therefore, the power unit 270 outputs to the output unit 280 a reduced amount of power based on the power control signal f2.

The output unit 280 receives an input image having a compensated level of brightness, which is compensated by the compensation unit 260, and power that is reduced by the power unit 270. Then, the output unit 280 calculates a brightness of an output image based on the brightness of the input image and the reduced power level, and displays the output image. In displaying the output image, the power inputted from the power unit 270 is reduced by the power control signal f2, and the brightness of the input image is increased in inverse proportion to the power reduction by the power control signal f2 received from the compensation unit 260. Therefore, the power level of the light source is reduced by the power control signal f2 and the brightness of the input image is not reduced.

Figure 2A:
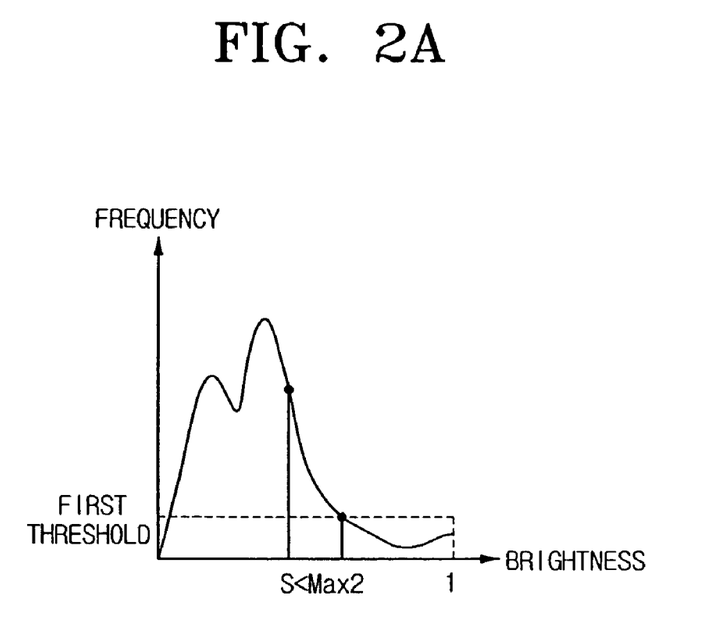
FIGS. 2A to 2D are views illustrating operation of a second maximum brightness value determination unit of the scene adaptive power control apparatus of FIG. 1.
Figure 2B:
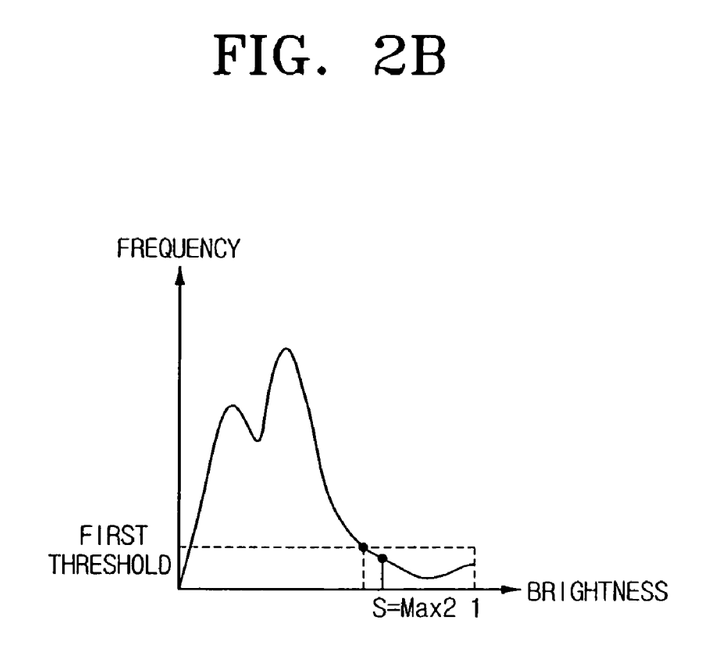
Figure 2C:
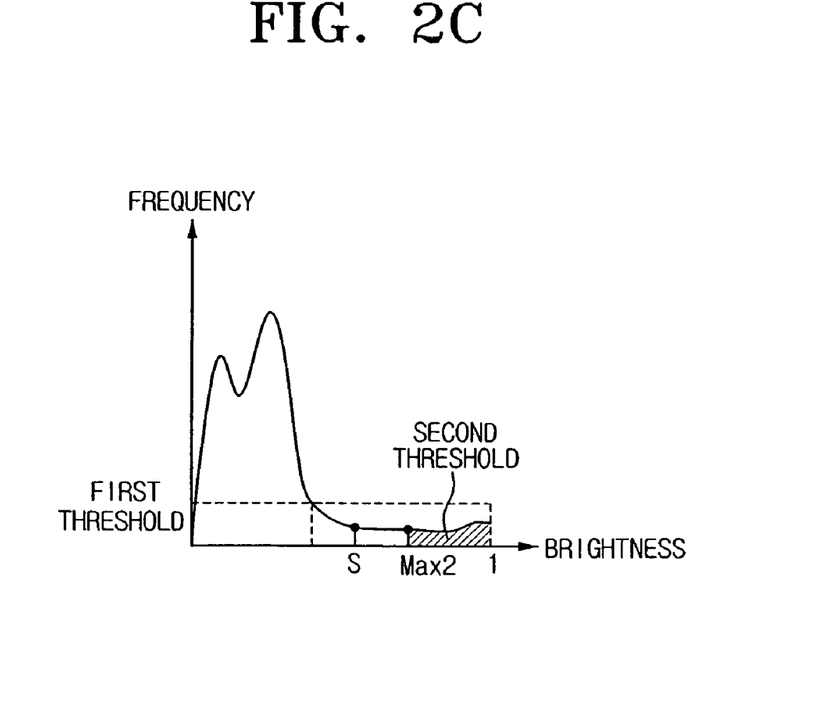
Figure 2D:
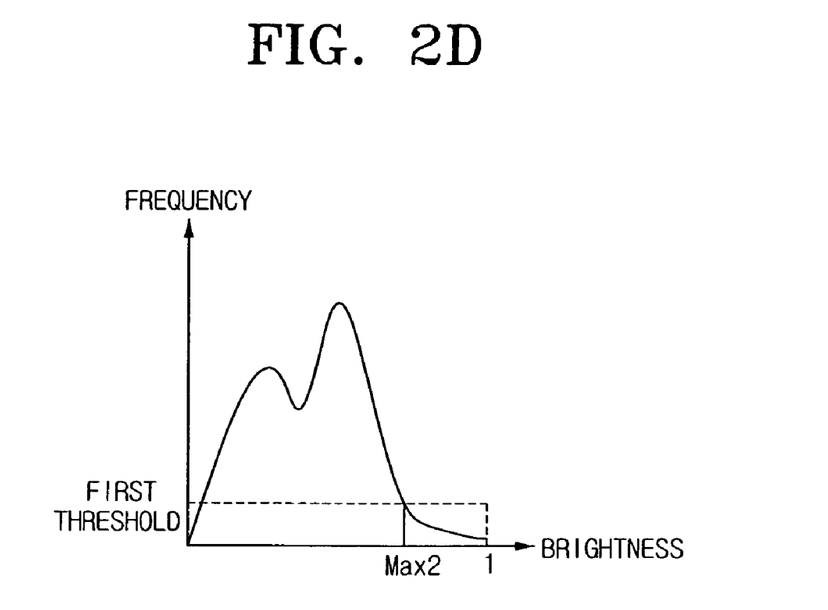

FIGS. 2A to 2D are views illustrating the operation of the Max 2 determination unit 230 of the scene adaptive power control apparatus of FIG. 1. In detail, FIGS. 2A to 2C illustrate a histogram of an input image in the case that the determination unit 221 determines that the BVLC are concentrated on a certain region. FIG. 2D illustrates a histogram of an input image in the case that the determination unit determines that the BVLC are not concentrated on a certain region.

Max 2 denotes a second maximum brightness value, and S denotes a mean brightness value of the certain region calculated by the calculation unit 223.

Referring to FIG. 2A, the greatest of brightness values matching the first threshold as a predetermined frequency value exceeds the mean brightness value S. The Max 2 determination unit 230 determines the greatest value matching the first threshold to be the Max 2 value as described with reference to FIG. 1.

Referring to FIG. 2B, if the greatest value matching the first threshold is below the mean brightness value S, the mean brightness value S is determined to be the Max 2 value. If the mean brightness value S of the BVLC concentrated on a certain region exceeds the greatest value matching the first threshold, the mean brightness value S has to be taken into account in determining the Max 2 value to prevent a contour error. This is because an unnatural grayscale may be displayed when the BVLC are actually clipped.

Therefore, the Max 2 value has a value greater than the greatest value matching the first threshold. Since the Max 2 value is greater than the greatest value matching the first threshold, a power level provided to the input image is relatively higher than that of the case where the greatest value matching the first threshold is determined to be the Max 2 value.

Referring to FIG. 2C, high pixel frequency values are skewed to low brightness values. In this case, if a Max 2 value is determined in the same way as in the cases of FIGS. 2A and 2B, a contour error occurs in the output image because the brightness values exceeding the Max 2 value that are actually clipped have high frequency values. That is, if the brightness values exceeding the Max 2 value have low frequency values but a sum of the frequency values is large, an image distortion may occur.

In this case, a Max2 value is determined such that a sum of pixel frequency values corresponding to clipped brightness values does not exceed a predetermined value, which is set in advance. That is, it is determined that a sum of frequency values of brightness values exceeding the Max 2 value reaches a second threshold, the Max 2 value being determined based on the comparison between the greatest value matching the first threshold on one hand and the mean brightness value on the other hand. When the sum of frequency values reaches the second threshold at a certain brightness value, the certain brightness value is determined to be the Max 2 value.

The sum of frequency values of the brightness values exceeding the second maximum brightness value Max 2 is obtained by adding the pixel frequency values corresponding to the brightness values, while decrementing from a Max 1 value of '1'. That is, when a sum of pixel frequency values between the Max 1 value and a predetermined value reaches the second threshold, the predetermined value is determined to be the Max 2 value.

Referring to FIG. 2D, the greatest value of brightness values matching the first threshold is determined to be the Max 2 value. If the BVLC are not concentrated on a certain region and they are actually clipped, a natural image can be obtained and thus a contour error of an output image does not occur.

Figure 3A:
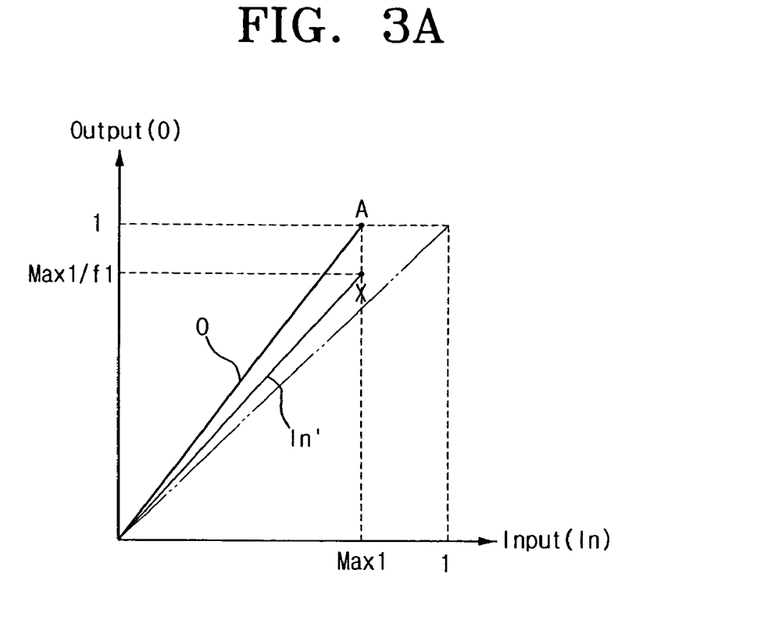
FIGS. 3A to 3C are views illustrating operation of an adjustment unit of the scene adaptive power control apparatus of FIG. 1.
Figure 3B:
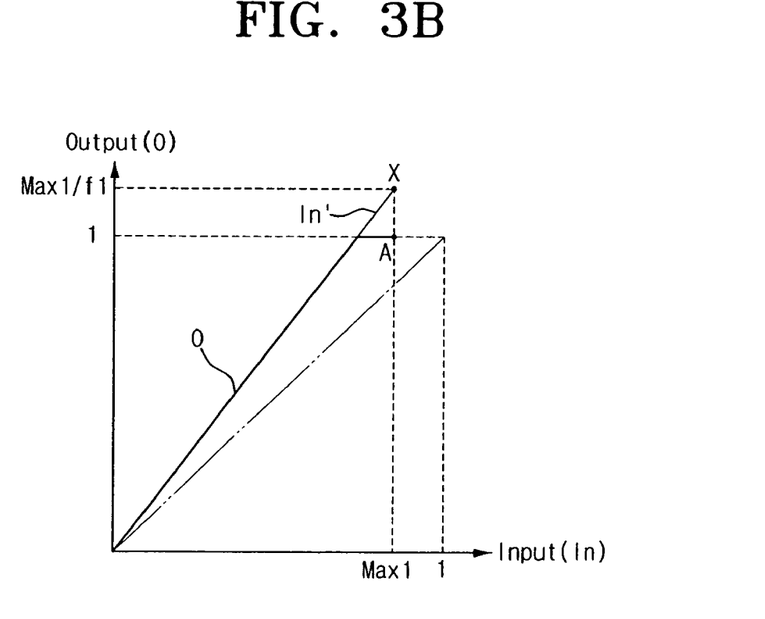
Figure 3C:
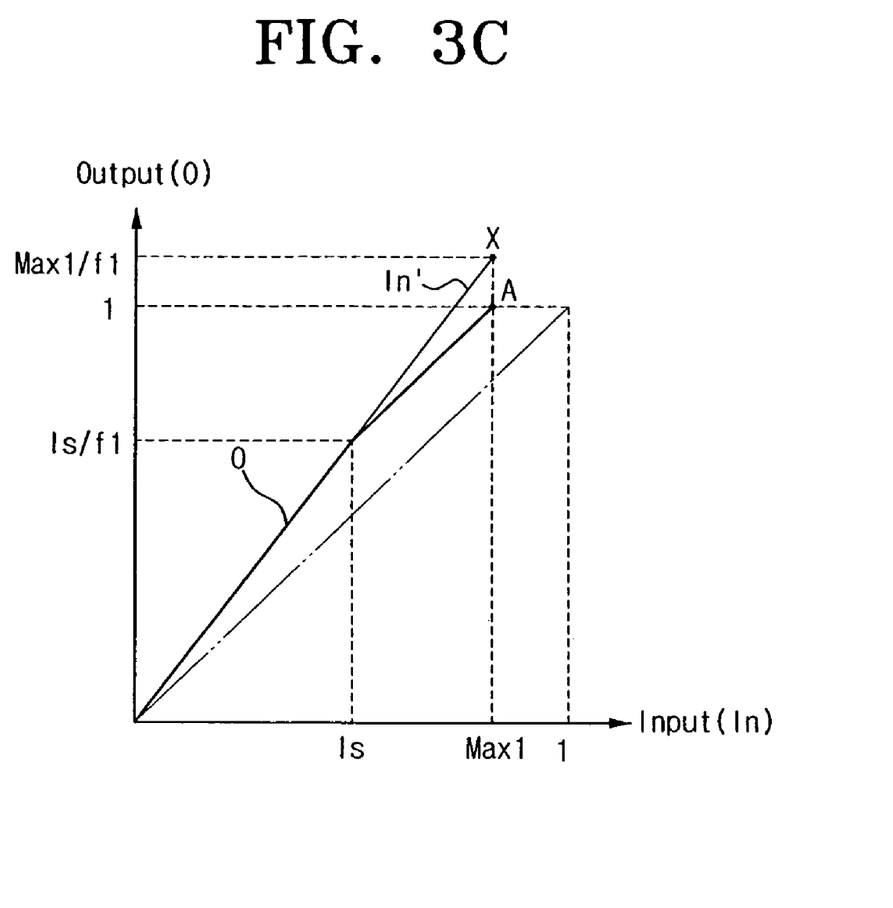

FIG. 3A to FIG. 3C are views illustrating the operation of the adjustment unit 250 of the scene adaptive power control apparatus of FIG. 1. FIG. 3A illustrates the case that the greatest brightness value of an output image after a power control signal f1 is applied to an input image is less than the maximum brightness value of the display device. FIGS. 3B and 3C illustrate the case that the greatest brightness value of an output value after a power control signal is applied to an input image exceeds the maximum brightness value of the display device.

Herein, 'In" denotes an output value obtained when a power controls signal generated by the generation unit 240 is applied to a brightness level of an input image, and 'O' denotes an output value obtained when a power control signal adjusted by the adjustment unit 250 is applied to a brightness level of an input image. 'A' indicates the maximum brightness value of the display device displaying the input image, and 'X' indicates the greatest brightness value of the brightness values after the power control signal f1 generated by the generation unit 240 is applied to the brightness values of the input image.

Referring to FIG. 3A, an output image is adjusted to make the greatest brightness value 'X' equal to the maximum brightness value 'A' of the display device, where the greatest brightness value 'X' is obtained after the power control signal f1 generated by the generation unit 240 is applied to the input image. The power control signal f1 is adjusted to the power control signal f2 such that the greatest brightness value 'X' of the output values matches the maximum brightness value 'A' of the display device.

Therefore, the greatest brightness value 'X' of the output values of the input image is normalized to the maximum brightness value 'A' of the display device (i.e. '1') such that the power control signal f1 is adjusted to have a lower value. That is, the power control signal f1 decreases by an amount as much as the output value of the input image increases in proportion to a difference 'A-X' between the greatest value 'X' of the output values of the input image and the maximum brightness value 'A' of the display device. Therefore, as the power control signal f1 decreases, a power level of a light source decreases.

Referring to FIG. 3B, if the greatest brightness value 'X' exceeds the maximum brightness value 'A' of the display device, where the greatest brightness value 'X' is determined based on output values after a power control signal f1 generated by the generation unit 240 is applied to a brightness of an input image, the output values having the brightness values exceeding the maximum brightness value 'A' of the display device cannot be expressed. Therefore, the output values exceeding the maximum brightness value 'A' of the display device (i.e. the values to be clipped) are adjusted to be below the maximum brightness value 'A' of the display device.

As described above, the Max 2 value is determined in consideration that the power control signal f1 does not cause a contour error even if the BVLC are actually clipped. Therefore, even if brightness values exceeding the maximum brightness value 'A' of the display device are actually clipped, a contour error does not occur. In this case, the power control signal f1 is not adjusted.

The power control signal f1 is applied until an output value reaches the maximum brightness value 'A' of the display device. If the output values exceed the maximum brightness 'A' of the display device, the output values are adjusted according to the maximum brightness value 'A' of the display device.

FIG. 3C illustrates the case where the power control signal f1 generated by the generation unit 240 is adjusted even if the greatest brightness value 'X' of output values, after the power control signal f1 is applied to the input image, is greater than the maximum brightness value 'A' of the display device.

Herein, 'Is' denotes a predetermined value less than the Max 2 value. The power control signal f1 generated by the generation unit 240 is applied until a brightness value reaches 'Is'. When a brightness value is over 'Is', the greatest brightness value 'X' is adjusted according to the maximum brightness value 'A' of the display device, and the power control signal f1 is adjusted according to the adjusted output value. The 'Is' value is a predetermined brightness value established so that a contour error is not caused in the output image. In FIG. 3C, the 'Is' value is 80% of the Max 2 value.

The greatest value 'X' of the output values of the input image, which is greater than the 'Is' value, is normalized to '1' as the maximum brightness value 'A' of the display device such that the power control signal f1 generated by the generation unit 240 increases. The power control signal f1 increases by an amount as much as the output value of the input image decreases in proportion to the difference 'X-A' between the greatest output value 'X' and the maximum brightness value 'A' of the display device. As the power control signal f1 increases, the power level of the light source increases.

If the Max 2 value determined by the Max 2 determination unit 230 has a relatively small value, the power control signal will have a small value, and thus the brightness of the input image after the power control signal f1 is applied is greater than the maximum brightness value 'A' of the display device. Therefore, the brightness values exceeding the maximum brightness value 'A' of the display device are adjusted according to the maximum brightness value 'A'. Based on the adjusted value of the brightness values, the power control signal f1 is increased.

Figure 4:
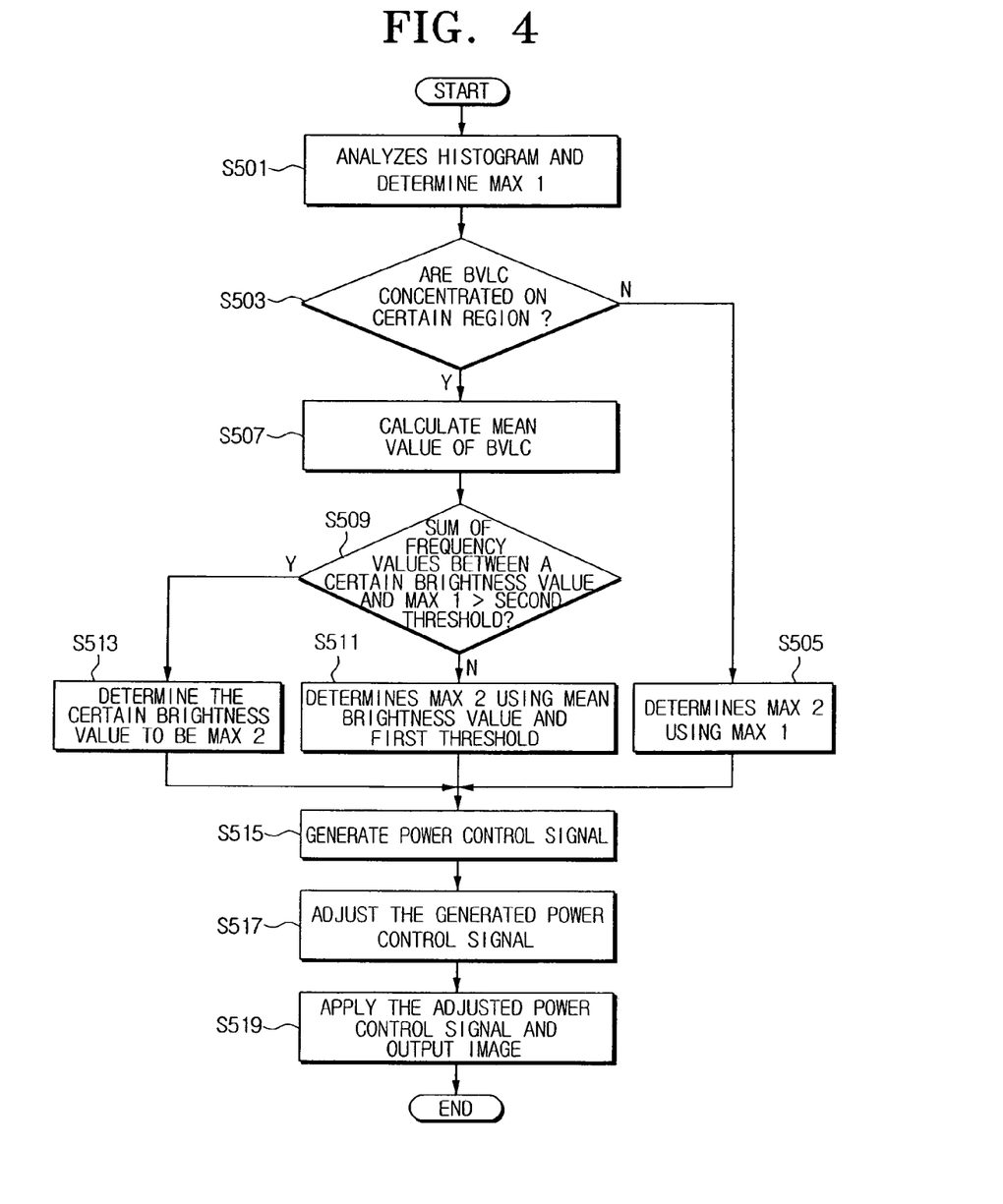
FIG. 4 is a flowchart illustrating a scene adaptive power control method according to an embodiment of the present general inventive concept.

FIG. 4 is a flowchart illustrating a scene adaptive power control method according to an embodiment of the present general inventive concept. Consecutive input images are denoted first, second and third input images by way of an example. The second input image is used in generating a power control signal, the third input image is displayed after the generated power control signal is applied, and the first input image is used in determining a second maximum brightness value Max 2 of the second input image.

Referring to FIG. 4, a histogram of the second input image is analyzed and a first maximum brightness value Max 1 of the second input image is determined at operation S501. Even if the greatest brightness value has a low frequency value, it is still determined as the Max 1.

Next, it is determined whether "brightness-values-likely-to-be-clipped" (BVLC) are concentrated on a certain region of the histogram of the second input image at operation S503. The BVLC are likely to have brightness values greater than a maximum brightness value 'A' of a display device. This can be determined if a power control signal generated by the generation unit 240 is applied to the brightness level of the second input image, and the BVLC are not probably expressed through the display device.

The BVLC may exceed the greatest brightness value of the first input image which is followed by the second image. Determining whether the BVLC are concentrated on a certain region is determined based on whether the number of brightness values exceeding the greatest brightness value of the first input image in the certain region is greater than a predetermined number. For example, it is assumed that a 7×3 window is set on the second input image. If 18 or more pixels of the total 21 pixels have brightness values greater the greatest brightness value of the first input image, it is determined that the BVLC are concentrated on a certain region of the second input image.

If the BVLC are not concentrated on a certain region, a second maximum brightness value Max 2 is determined using a first threshold at operation S505. The Max 2 value is the greatest brightness value of the input image that is determined without considering a high brightness value having a low frequency. The first threshold is a predetermined pixel frequency value. If a pixel frequency value is below the first threshold, the pixel frequency value is not taken into account in determining the Max 2 value.

If the BVLC are not concentrated on a certain region and they are not taken into account in displaying an image, a contour error of an output image does not occur. Therefore, in this case, the greatest value of brightness values matching the first threshold is determined to be the Max 2 value.

On the other hand, if the BVLC are concentrated on a certain region, a mean brightness value S of the BVLC is calculated at operation S507. This is because the BVLC concentrated on a certain region causes an image distortion if they are actually clipped. Therefore, if the BVLC are concentrated on a certain region, the mean brightness value S is calculated so that the BVLC can be taken into account when amending the Max 1 value to reduce a power level of a light source.

In the above example of a 7×3 window, the mean brightness value S is a mean brightness value of pixels existing within the window. To use the BVLC in amending the Max 1 value, not only the mean brightness value S but also a median brightness value of the BVLC may be used.

Next, it is determined whether a sum of corresponding brightness pixels between the Max 1 value and the mean brightness value S or the greatest value matching the first threshold reaches a second threshold at operation S509.

If the Max 2 value is determined based on the comparison between the greatest brightness value matching the first threshold on one hand and the mean brightness value or the median brightness value on the other hand, in the case that the high pixel frequency values are skewed to the low brightness values, the Max 2 value is relatively low. If the brightness values exceeding the relatively low Max 2 value have low frequency values but a sum of their frequency values is large, an image distortion may occur because the brightness values having the low frequency values are not displayed.

If the sum of frequency values is not above the second threshold at operation S509, the Max 2 value is determined using the mean brightness value S and the first threshold at operation S511. The greater value resulting from the comparison between the greatest value matching the first threshold and the mean brightness value S is determined to be the Max 2 value.

If it is determined that the sum of frequency values is not above the second threshold at operation S509, the brightness values exceeding the mean brightness value S or the greatest value matching the first threshold have low frequency values. Therefore, even if the Max 2 value is determined based on the consideration of the mean brightness value S and the first threshold, and the power level is reduced based on the Max 2 value, a contour error does not occur.

One the other hand, if it is determined that the sum of frequency values is above the second threshold at operation S509, a brightness value at which the sum reaches the second threshold is determined to be Max 2 at operation S513. If the sum of frequency values is above the second threshold, the brightness values exceeding the mean brightness value S or the greatest value matching the first threshold have high frequency values. Thus, this is the case that high frequency values are skewed to low brightness values. In this case, if the Max 2 value is determined using the greatest brightness value matching the first threshold or the mean brightness value S, a contour error is caused because the sum of frequency values having a high level of brightness exceeds the Max 2 value.

As described above, when a power control signal is generated, it is necessary to consider the brightness values exceeding the mean brightness value S or the greatest brightness value matching the first threshold. It is determined whether a sum of corresponding frequency values matches the second threshold while decrementing from the Max 1 value. When the sum of frequency values reaches the second threshold at a certain brightness value, the brightness value is determined to be the Max 2 value.

Next, a power control signal f1 is generated based on the Max 2 value and the Max 1 value at operation S515. The power control signal f1 is calculated by dividing the Max 2 value by the Max 1 value. The Max 1 value is the greatest brightness value of the second input image. The Max 2 value is the greatest brightness value after a brightness value located at a high level but having a low frequency value is clipped.

Since the Max2 value is less than the Max 1 value, the generated power control signal f1 is less than '1'. The power control signal f1 less than '1' is applied to reduce a power level of a light source used in displaying the third input image.

The generated power control signal f1 is adjusted using the maximum brightness value 'A' of the display device at operation S517. When the power level of the light source is reduced by the generated power control signal f1, it is necessary to compensate the power level reduction to prevent a brightness of the third input image from being reduced. That is, the brightness of the third input image is increased by an amount as much as the power level is reduced by the power control signal f1.

At this time, if the brightness of the third input image increases in proportion to a reciprocal of the power control signal f1, and the greatest output brightness value 'X' of the third input image is equal to the maximum brightness value 'A' of the display device, the power control signal f1 is adjusted to make the greatest brightness value 'X' equal to the greatest brightness value 'A'.

If the greatest output brightness value 'X' is greater than the maximum brightness value 'A' of the display device, the brightness value cannot be expressed through the display device.

If the greatest output brightness value 'X' is less than the maximum brightness value 'A' of the display device, the input image is adjusted until the greatest output brightness value 'X' reaches the maximum brightness value 'A' of the display device, and the power control signal f1 is adjusted according to the adjusted brightness value of the input image. Therefore, the power level of the light source can be reduced by as much as the brightness value of the input image increases.

An adjusted power control signal f2 is applied to the power unit 270 and the input image is outputted at operation S519. The compensation unit 260 applies a reciprocal of the power control signal f2 generated using the histogram of the second input image to the third input image, thus increasing the brightness of the third input image. That is, when the power control signal f2 is applied, the power level of the light source is reduced, which results in a reduction in the brightness of the third input image. In order to increase the brightness of the third input image, a reciprocal of the power control signal f2 is applied to the third input image.

The adjusted power control signal f2 is applied to the light source such that the power level of the light source is reduced. A brightness level of the output image is determined by multiplying the brightness value of the third input image, which is increased to compensate the reduction, with the reduced power of the light source.

As described above, since the power level of the light source is reduced based on the consideration of the greatest brightness value of the histogram of the input image, the power consumption is reduced.

As a result of the reduction of the power consumption, a using time of a mobile display device is prolonged. Also, high power consumption problem caused by a big-sized screen display device can be reduced.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A scene adaptive power control device which uses first, second and third input images as consecutive input images and controls a power level of a light source used in displaying the third input image, the device comprising:
    a histogram analysis unit to generate and analyze a histogram of the second input image and detect a first maximum brightness value which is the greatest brightness value of the second input image;
    a determination unit to detect brightness values that match a first threshold predetermined frequency value in the generated histogram and to determine the greatest value of the detected brightness values to be a second maximum brightness value;
    a generation unit to generate a power control signal to control the power level of the light source based on a value obtained by dividing the second maximum brightness value by the first maximum brightness value; and
    a compensation unit to increase a brightness of the third input image in inverse proportion to the power level of the light source reduced by the power control signal.

2. A scene adaptive power control apparatus which uses first, second, third input images as consecutive input images and controls a power level of a light source used in displaying the third input image, the apparatus comprising:
    a histogram analysis unit to generate and analyze a histogram of the second input image and detect a first maximum brightness value that is the greatest brightness value of the second input image;
    a determination unit to determine whether "brightness-values-likely-to-be-clipped" (BVLC) are concentrated on a certain region of a scene of the histogram of the second input image displayed;
    a calculation unit to calculate one of a mean brightness value and a median brightness value of the BVLC if the BVLC are concentrated on the certain region;
    a second maximum brightness value determination unit to determine a second maximum brightness value from the first maximum brightness value based on one of the mean brightness value and the median brightness value, a first threshold predetermined frequency value, and a second threshold;
    a generation unit to generate a power control signal to control the power level of the light source based on a value obtained by dividing the second maximum brightness value by the first maximum brightness value;
    an adjustment unit to adjust the power control signal based on brightness values of the second input image that are increased in inverse proportion to the power level of the light source reduced by the power control signal, and based on a maximum brightness value of the display device displaying the first to third input images; and
    a compensation unit to increase a brightness of the third input image in inverse proportion to the power level of the light source reduced by the adjusted power control signal.

3. The scene adaptive power control apparatus as claimed in claim 2, wherein the BVLC are greater than the maximum brightness value of the display device.

4. The scene adaptive power control apparatus as claimed in claim 2, wherein the determination unit determines whether the BVLC are concentrated on the certain region based on whether the number of brightness values exceeding the second maximum brightness value of the first input image in the certain region is greater than a predetermined number.

5. The scene adaptive power control apparatus as claimed in claim 2, wherein the second maximum brightness value determination unit compares the greatest of brightness values matching the first threshold of the histogram with one of the mean brightness value and the median brightness value, and as a result of the comparison, determines the greater value to be the second maximum brightness value.

6. The scene adaptive power control apparatus as claimed in claim 2, wherein the second maximum brightness value determination unit determines whether a sum of frequency values of brightness values exceeding one of the mean brightness value and the median brightness value and also exceeding the greatest brightness value matching the first threshold is greater than a second threshold.

7. The scene adaptive power control apparatus as claimed in claim 6, wherein, if the sum of frequency values is greater than the second threshold, it is determined whether a sum of frequency values reaches the second threshold by decrementing from the first maximum brightness value until the sum reaches the second threshold at a certain brightness value, where the certain brightness value is determined to be the second maximum brightness value.

8. The scene adaptive power control apparatus as claimed in claim 2, wherein, if the increased greatest brightness value of the second input image is below the maximum brightness value of the display device, the adjustment unit adjusts the power control signal based on a value used to adjust the brightness values of the second input image to make the greatest brightness value of the second input image equal to the maximum brightness value of the display device.

9. The scene adaptive power control apparatus as claimed in claim 2, wherein, if the increased greatest brightness value of the second input image is greater than the maximum brightness value of the display device, the adjustment unit adjusts the greatest brightness value of the second input image according to the maximum brightness value of the display device.

10. The scene adaptive power control apparatus as claimed in claim 2, wherein, if the increased greatest brightness value of the second input image is greater than the maximum brightness value of the display device, the adjustment unit adjusts the power control signal based on a value used to adjust the brightness values of the second input image to make the greatest brightness value exceeding a predetermined brightness value equal to the maximum brightness value of the display device.

11. The scene adaptive power control apparatus as claimed in claim 10, wherein the predetermined brightness value is 0.8 times the second maximum brightness value.

12. A scene adaptive power control method of a scene adaptive power control apparatus which uses first, second and third input images as consecutive input images and controls a power level of a light source used in displaying the third input image, the method comprising:
generating and analyzing a histogram of the second input image and detecting a first maximum brightness value which is the greatest brightness value of the second input image;
detecting brightness values matching a first threshold predetermined frequency value from the generated histogram and determining the greatest value of the detected brightness values as a second maximum brightness value;
generating a power control signal based on a value obtained by dividing the second maximum brightness value by the first maximum brightness value, the power control signal controlling the power level of the light source; and
increasing a brightness of the third input image in inverse proportion to the power level of the light source reduced by the power control signal.

13. A power control method of a scene adaptive power control apparatus which uses first, second, third input images as consecutive input images and controls a power level of a light source used in displaying the third input image, the method comprising:
generating and analyzing a histogram of the second input image and detecting a first maximum brightness value that is the greatest brightness value of the second input image;
determining whether "brightness-values-likely-to-be-clipped" (BVLC) are concentrated on a certain region of a scene of the histogram of the second input image displayed;
if the BVLC are concentrated on the certain region, calculating one of a mean brightness value and a median brightness value of the BVLC;
determining a second maximum brightness value from the first maximum brightness value based on one of the mean brightness value and the median brightness value, a first threshold predetermined frequency value, and a second threshold;
generating a power control signal based on a value obtained by dividing the second maximum brightness value by the first maximum brightness value, the power control signal controlling the power level of the light source;
adjusting the power control signal based on brightness values of the second input image that are increased in inverse proportion to the power level of the light source reduced by the power control signal, and based on a maximum brightness value of the display device displaying the first to third input images; and
increasing a brightness of the third input image in inverse proportion to the power level of the light source reduced by the adjusted power control signal.

14. The scene adaptive power control method as claimed in claim 13, wherein the BVLC exceed the maximum brightness value of the display device.

15. The scene adaptive power control method as claimed in claim 13, wherein the determining whether the BVLC are concentrated on the certain region of the scene of the histogram of the second input image is based on whether the number of brightness values exceeding the second maximum brightness value of the first input image in the certain region is greater than a predetermined number.

16. The scene adaptive power control method as claimed in claim 13, wherein the determining the second maximum brightness value from the first maximum brightness value based on one of the mean brightness value and the median brightness value, a first threshold predetermined frequency value, and a second threshold, provides comparing the greatest value of brightness values matching the first threshold of the histogram with one of the mean brightness value and the median brightness value, and as a result of the comparison, determines the greater value to be the second maximum brightness value.

17. The scene adaptive power control method as claimed in claim 13, wherein the determining the second maximum brightness value from the first maximum brightness value based on one of the mean brightness value and the median brightness value, the first threshold predetermined frequency value, and the second threshold, provides determining whether a sum of frequency values of brightness values exceeding one of the mean brightness value and the median brightness value and also exceeding the greatest brightness value matching the first threshold is greater than a second threshold.

18. The scene adaptive power control method as claimed in claim 17, wherein, if the sum of frequency values is greater than the second threshold, it is determined whether a sum of frequency values reaches the second threshold, while decrementing from the first maximum brightness value, and when the sum reaches the second threshold at a certain brightness value, the certain brightness value is determined to be the second maximum brightness value.

19. The scene adaptive power control method as claimed in claim 13, wherein if the increased greatest brightness value of the second input image is below the maximum brightness value of the display device, adjusting the power control signal based on a value used to adjust the brightness values of the second input image to make the greatest brightness value of the second input image equal to the maximum brightness value of the display device.

20. The scene adaptive power control method as claimed in claim 13, wherein if the increased greatest brightness value of the second input image is greater than the maximum brightness value of the display device, adjusting the greatest brightness value of the second input image according to the maximum brightness value of the display device.

21. The scene adaptive power control method as claimed in claim 13, wherein if the increased greatest brightness value of the second input image is greater than the maximum brightness value of the display device, adjusting the power control signal based on a value used to adjust the brightness values of the second input image to make the greatest brightness value exceeding a predetermined brightness value equal to the maximum brightness value of the display device.

22. The scene adaptive power control method as claimed in claim 21, wherein the predetermined brightness value is 0.8 times the second maximum brightness value.

23. A power control display device comprising:
a histogram analysis unit to generate a histogram of a first input image and to detect a first maximum brightness value based on the histogram;
a determination unit to determine brightness values that match a first threshold frequency value in the generated histogram and to determine the greatest value of the determined brightness values as a second maximum brightness value;
a generation unit to generate a power control signal to change the power level of a light source of the display based on a combination of the second maximum brightness value and the first maximum brightness value; and
a compensation unit to change a brightness of a second input image in inverse proportion to the change of the power level of the light source.

24. The device of claim 23, wherein the first maximum brightness value is the greatest brightness value of the first input image.

25. The device of claim 23, wherein the second maximum brightness value is based on the first maximum brightness value and the first threshold frequency value.

26. The device of claim 23, wherein the combination of the second maximum brightness value and the first maximum brightness value is obtained by dividing the second maximum brightness value by the first maximum brightness value.

27. The device of claim 23, wherein the change of the power level of the light source is a reduction in the power level and the change of the brightness of the second input image is an increase in the brightness.

28. The device of claim 23, further comprising:
an adjustment unit to adjust the power control signal based on brightness values of the first input image that are increased in inverse proportion to the power level of the light source reduced by the power control signal, and based on a maximum brightness value of the display device.

29. A method of controlling power of a display comprising:
generating a histogram of a first input image to detect a first maximum brightness value based on the histogram;
determining brightness values matching a first threshold frequency value in the generated histogram and determining the greatest value of the determined brightness values as a second maximum brightness;
generating a power control signal to change the power level of a light source of the display based on a combination of the second maximum brightness value and the first maximum brightness value; and
changing a brightness of a second input image in inverse proportion to the change of the power level of the light source.

30. A power control display device comprising:
a histogram analysis unit to generate a histogram of a first input image and to detect a first maximum brightness value based on the histogram;
a determination unit to determine whether "brightness-values-likely-to-be-clipped" (BVLC) are concentrated on a certain region of the histogram of the first input image displayed;
a calculation unit to calculate one of a mean brightness value and a median brightness value of the BVLC if the BVLC are concentrated on the certain region;
a second determination unit to determine a second maximum brightness value from the first maximum brightness value based on one of the mean brightness value and the median brightness value, a first threshold, and a second threshold;
a generation unit to generate a power control signal to change the power level of a light source of the display based on a combination of the second maximum brightness value and the first maximum brightness value; and
a compensation unit to change a brightness of a second input image in inverse proportion to the change of the power level of the light source.

31. The device of claim 30, wherein the first maximum brightness value is the greatest brightness value of the first input image.

32. The device of claim 30, wherein the combination of the second maximum brightness value and the first maximum brightness value is obtained by dividing the second maximum brightness value by the first maximum brightness value.

33. The device of claim 30, wherein the change of the power level of the light source is a reduction in the power level and the change of the brightness of the second input image is an increase in the brightness.

34. The device of claim 30, further comprising:
an adjustment unit to adjust the power control signal based on brightness values of the first input image that are increased in inverse proportion to the power level of the light source reduced by the power control signal, and based on a maximum brightness value of the display device.

35. A method of controlling power of a display comprising:
generating a histogram of a first input image and detecting a first maximum brightness value based on the histogram;
determining whether "brightness-values-likely-to-be-clipped" (BVLC) are concentrated on a certain region of the histogram of the first input image displayed;

calculating one of a mean brightness value and a median brightness value of the BVLC if the BVLC are concentrated on the certain region;

determining a second maximum brightness value from the first maximum brightness value based on one of the mean brightness value and the median brightness value, a first threshold, and a second threshold;

generating a power control signal to change the power level of a light source of the display based on a combination of the second maximum brightness value and the first maximum brightness value; and changing a brightness of a second input image in inverse proportion to the change of the power level of the light source controlled by the power control signal.

36. A power control display device which uses first, second and third input images as consecutive input images and controls a power level of a light source used in displaying the third input image, the device comprising:

a histogram analysis unit to determine a first maximum brightness value of the second input image;

a determination unit to determine a second maximum brightness value by reducing the first maximum brightness value;

a generation unit that uses the second input image to calculate a power control signal based on a combination of the first and second maximum brightness values;

a power unit to apply the power control signal to lower the power level of the light source; and a compensation unit to increase the brightness value of the third input image in inverse proportion to the lowered power level of the light source.

37. A power control display method which uses first, second and third input images as consecutive input images and controls a power level of a light source used in displaying the third input image, the method comprising:

determining a first maximum brightness value of the second input image;

determining a second maximum brightness value by reducing the first maximum brightness value;

using the second input image to calculate a power control signal based on a combination of the first and second maximum brightness values;

applying the power control signal to lower the power level of the light; and increasing the brightness value of the third input image in inverse proportion to the lowered power level.

38. A scene adaptive power control device to control a power level of a light source used to display a final input image of a plurality of input images, the device comprising:

a histogram analysis unit to output a first maximum brightness value of the plurality of input images;

a brightness analysis unit to output a second maximum brightness value of the plurality of input images;

a generation unit to generate a power control signal to control the power level of the light source based on a value obtained by dividing a second maximum brightness value by the first maximum brightness value; and a compensation unit to decrease the power level of the light source and increase a brightness of the final input image based on the power control signal generated by the generation unit.

39. The scene adaptive power control device of claim 38, wherein:
the first maximum brightness value is a greatest brightness value of an image preceding the final input image; and
the second maximum brightness value is a greatest value of a plurality of brightness values that match a threshold predetermined pixel frequency value.

40. The scene adaptive power control device of claim 38, further comprising:
a histogram analysis unit to generate and analyze a histogram of the image preceding the final input image, such that the first maximum brightness value is detected.

41. The scene adaptive power control device of claim 40, wherein the brightness analysis unit determines whether brightness-values-likely-to-be-clipped (BVLC) are concentrated on a certain region of the histogram.

42. The scene adaptive power control device of claim 41, wherein the brightness analysis unit calculates a mean brightness value or a median brightness value of the BVLC if the BVLC are concentrated in the certain region.

43. The scene adaptive power control device of claim 42, further comprising:
a determination unit to compare the first maximum brightness value with the mean brightness value or the median brightness value to determine the second maximum brightness value.

44. A method of controlling a power level of a light source of a display, the method comprising:
outputting a first maximum brightness value of a plurality of input images;
outputting a second maximum brightness value of the plurality of input images;
generating a power control signal to control the power level of the light source based on a value obtained by dividing a second maximum brightness value by the first maximum brightness value;
decreasing the power level of the light source; and
increasing a brightness of a final input image of the plurality of input images based on the generated power control signal.

45. The method of claim 44, wherein:
the first maximum brightness value is a greatest brightness value of an image preceding the final input image; and
the second maximum brightness value is a greatest value of a plurality of brightness values that match a threshold predetermined pixel frequency value.

46. The method of claim 44, further comprising:
generating a histogram of the image preceding the final input image; and
analyzing the histogram such that the first maximum brightness value is detected.

47. The method of claim 46, further comprising:
determining whether brightness-values-likely-to-be-clipped (BVLC) are concentrated on a certain region of the histogram.

48. The scene adaptive power control device of claim 47, further comprising:
calculating a mean brightness value or a median brightness value of the BVLC if the BVLC are concentrated in the certain region.

49. The scene adaptive power control device of claim 48, further comprising:
comparing the first maximum brightness value with the mean brightness value or the median brightness value to determine the second maximum brightness value.

* * * * *